United States Patent
Takahashi et al.

(10) Patent No.: US 6,616,746 B2
(45) Date of Patent: Sep. 9, 2003

(54) TITANIUM DIOXIDE PIGMENT AND METHOD FOR PRODUCTION THEREOF

(75) Inventors: Hideo Takahashi, Yokkaichi (JP); Eiji Yamada, Yokkaichi (JP); Toshihiko Akamatsu, Yokkaichi (JP); Takeshi Fujimura, Yokkaichi (JP)

(73) Assignee: Ishihara Sangyo Kaisha, Ltd., Osaka (JP)

( * ) Notice: Subject to any disclaimer, the term of this patent is extended or adjusted under 35 U.S.C. 154(b) by 0 days.

(21) Appl. No.: 10/149,983

(22) PCT Filed: Dec. 14, 2000

(86) PCT No.: PCT/JP00/08847

§ 371 (c)(1),
(2), (4) Date: Jun. 13, 2002

(87) PCT Pub. No.: WO01/44111

PCT Pub. Date: Jun. 21, 2001

(65) Prior Publication Data

US 2003/0079655 A1 May 1, 2003

(30) Foreign Application Priority Data

Dec. 17, 1999 (JP) ............................................ 11-358207

(51) Int. Cl.⁷ .............................................. C04B 14/00
(52) U.S. Cl. ....................... 106/436; 106/426; 106/428; 106/430; 106/431; 106/443; 106/447
(58) Field of Search ................................ 106/426, 428, 106/430, 431, 436, 443, 447

(56) References Cited

U.S. PATENT DOCUMENTS 5,631,310 A    5/1997   Tooley et al.

FOREIGN PATENT DOCUMENTS

| EP | 0 498 122 | 8/1992 | |
|----|-----------|--------|---|
| EP | 0 870 731 | 10/1998 | |
| JP | 57 036157 | 2/1982 | |
| JP | 58-185405 | 10/1983 | |
| JP | 10-130527 | 5/1998 | |
| JP | 10-324817 | 12/1998 | |
| JP | 2001-172429 A | * 6/2001 | .............. C08J/3/22 |

* cited by examiner

Primary Examiner—C. Melissa Koslow
Assistant Examiner—Shalie Manlove
(74) Attorney, Agent, or Firm—Paul E. White, Jr.; Manelli Denison & Selter PLLC

(57) ABSTRACT

The titanium dioxide pigment of this invention has on the titanium dioxide particle surface a coating layer comprising a polyhydric alcohol and a hydrolysis product of an aminosilane compound, has a dispersibility of not more than 20 kg/cm² as judged in terms of resin pressure increase, and is excellent in hydrophobicity and dispersibility. The pigment is useful as a coloring agent for plastics which requires good lacing resistance and dispersibility.

9 Claims, No Drawings

TITANIUM DIOXIDE PIGMENT AND METHOD FOR PRODUCTION THEREOF

TECHNICAL FIELD

This invention relates to a titanium dioxide pigment which exhibits an excellent dispersibility and a high hiding power in plastics, particularly in polyolefin resins and to a process for producing the pigment.

BACKGROUND ART

Since titanium dioxide pigments are hydrophilic, they have low affinity for organic resins and, when compounded into plastics, they are apt to cause defective processing, such as so-called lacing (void formation) and pinholes, due to poor dispersion of titanium dioxide pigments. For ameliorating the situation, some methods have been proposed in which the particle surface of titanium dioxide is coated with various organic compounds to improve its affinity for plastic resins. These methods, however, are not sufficiently effective and, particularly when thin film is processed with polyolefin resins such as polyethylene and polypropylene, a high degree of hiding effect is difficult to obtain.

DISCLOSURE OF THE INVENTION

The object of this invention is, overcoming the above-mentioned problems of the prior art, to provide a titanium dioxide pigment which is excellent in affinity and dispersibility, hardly produces defective results in plastics processing including thin film processing and has a high hiding power, and a process for producing the pigment.

The present inventors have made extensive study to solve the above-mentioned problems. As a result, the inventors have found that (1) when a hydrolysis product of aminosilane compounds is coated on the particle surface of titanium dioxide, the affinity of the titanium dioxide for plastic resins, particularly polyolefin resins, is enhanced and that (2) when a polyhydric alcohol is additionally coated, the dispersibility is further improved. The present invention has been accomplished on the basis of the above finding.

Thus, this invention provides a titanium dioxide pigment which comprises titanium dioxide particles having a coating layer comprising a polyhydric alcohol and a hydrolysis product of an aminosilane compound, wherein the dispersibility of the pigment, as judged in terms of resin pressure increase, is not more than 20 kg/cm², and a process for producing the pigment.

BEST MODE FOR CARRYING OUT THE INVENTION

The titanium dioxide which constitutes the base substance of the titanium dioxide pigment of this invention preferably has an average particle diameter of 0.1–0.4 μm as measured by electron microphotography, and its crystal form may be either of the anatase type or of the rutile type or a mixture of the two types. The titanium dioxide may be either a product obtained by the so-called sulfate process in which a titanium sulfate solution is hydrolyzed or a product obtained by the so-called chloride process wherein a titanium halide is oxidized in gas phase.

Since titanium dioxide pigments in general are poor in resistance to light, plastic resins incorporated with the pigment, under ultraviolet light, are apt to undergo discoloration or fading or to undergo acceleration of decomposition. Therefore, the titanium dioxide pigment in this invention preferably has on its surface a coating layer comprising the hydrated oxide of aluminum. Moreover, the coating of hydrated oxide of aluminum facilitates the operations of dehydration, drying, grinding, etc. in the process of producing the titanium dioxide pigment, so that said coating is also favorable from the industrial aspect. The coating amount of the hydrated oxide of aluminum is preferably 0.01–0.5% by weight in terms of $Al_2O_3$ relative to titanium dioxide constituting the base substance. When the amount is smaller than the above-mentioned range, the intended light resistance tends to be difficult to obtain, whereas when it is larger than the range, owing to bound water contained in the hydrated oxide, when the titanium dioxide pigment is compounded into a plastic resin and the resin is subjected, for example, to thin film processing, defective processing due to contained water is apt to occur in the plastic processing. The above-mentioned coating layer need not coat the whole surface of titanium dioxide but may partly contain uncoated portion within limits wherein the intended light resistance can be obtained. Furthermore, other coating layers suited to titanium dioxide pigment which are known to the art, for example, layers of hydrated oxides of silicon, tin, zirconium, etc., may be provided within ranges not deleterious to the object of this invention.

The titanium dioxide pigment of this invention has on its surface, preferably via an above-mentioned coating layer comprising the hydrated oxide of aluminum, a coating layer comprising a polyhydric alcohol and a hydrolysis product of an aminosilane compound. The hydrolysis product of an aminosilane compound and hydroxyl groups which titanium dioxide has on its surface chemically react and bond with each other thereby to coat the surface of titanium dioxide with amino-containing hydrocarbon groups, so that the affinity of the surface for olefin resins is enhanced. Consequently, when the titanium dioxide pigment of this invention is compounded into plastic resins, particularly olefin resins, and the resin is formed into thin film or the like, a high hiding effect can be obtained. Though the hydrolysis product of an aminosilane compound in some cases liberates a part of the compound as an unreacted substance, even in such cases the adhesion and aggregation of titanium dioxide particles via an unreacted free substance can be prevented by the polyhydric alcohol-type compound in this invention, so that the titanium dioxide pigment is excellent also in dispersibility.

The aminosilane compound used in this invention is preferably a compound represented by the following formula (1)

$$R_n\text{---}Si\text{---}(OR')_{4-n} \qquad (1)$$

wherein R is an amino group-containing hydrocarbon group having 1–10 carbon atoms selected from the group consisting of aminoalkyl groups, diaminoalkyl groups and triaminoalkyl groups, R' is the methyl group or ethyl group, and n is an integer of 1–3; provided that when n is 2 or 3, R may be either the same kind of amino group-containing hydrocarbon groups or different kinds of amino group-containing hydrocarbon groups and that so long as at least one R is an amino group-containing hydrocarbon group, the remaining R(s) may be an alkyl group, preferably an alkyl group having 1–10 carbon atoms, vinyl group or methacryl group. When the hydrocarbon group of R has 11 or more carbon atoms, not only the aminosilane compound tends to be difficult to hdyrolyze but the titanium dioxdie pigment coated therewith tends to be poor in heat resistance and, as the result of heating at the drying and/or grinding step conducted after the coating, the titanium dioxide powder tends to become yellowish and resultantly processed plastic products also tend to become yellowish.

Specific examples of the aminosilane compound include N-β(aminoethyl)γ-aminopropyltrimethoxysilane, N-β(aminoethyl)γ-aminopropyltriethoxysilane, γ-aminopropyltrimethoxysilane, γ-aminopropyltriethoxysilane, N-β(aminoethyl)γ-aminopropylmethyldimethoxysilane and γ-aminopropylmethyldimethoxysilane, used each alone or in a combination of two or more thereof.

The hydrolysis product in this invention refers to a product wherein the alkoxy group of the aminosilane compound represented by the above-mentioned formula has been hydrolyzed to form a silanol and a product wherein the silanols have undergone polycondensation with each other to form an oligomer or polymer having a siloxane linkage. The hydrolysis product may partly contain an unreacted aminosilane compound within limits not deleterious to the object of this invention.

The coating amount of the hydrolysis product of aminosilane compound in this invention is preferably 0.01–3.0% by weight, more preferably 0.02–1.0% by weight, in terms of the aminosilane compound relative to titanium dioxide constituting the base substance. When the amount is less than the above-mentioned range, the intended effect tends to be difficult to obtain, whereas when it is larger than the range, a desired effect corresponding to the amount of aminosilane compound added is hardly obtained and moreover it is economically disadvantageous.

The polyhydric alcohol in this invention refers to a hydrocarbon compound having 10 or less carbon atoms and having 2–4 hydroxyl groups in the molecule. It may be, for example, polyols such as trimethylolethane, trimethylolpropane and pentaerythritol, and further includes an alkyleneoxide adduct thereof and an etherification product thereof with a monofunctional alcohol. It is preferably a polyol, more preferably trimethylolethane, trimethylolpropane or pentaerythritol. The coating amount of the polyhydric alcohol is preferably 0.0–51.0% by weight relative to titanium dioxide constituting the base substance. When the coating amount is in the above-mentioned range, the intended dispersibility can be obtained with good economical efficiency.

The term "resin pressure increase" used in this invention refers to a value determined by the following method.
(Method of Dispersibility Evaluation)

In a juice mixer are mixed for 5 minutes 500 g of a titanium dioxide pigment, 500 g of a freeze-ground polyethylene resin (Sumikasen L-705, a trade name, mfd. by Sumitomo Chemical Co., Ltd.) and 20 g of zinc stearate. The resulting mixture is melt-extruded over 1 hour with a Labo Plastomill twin-screw extruder (mfd. by Toyo Seiki Seisakusho, Ltd.) at a resin temperature set at 280° C., a 1,450-mesh screen being provided at the discharge side. The resin pressure at the time of initiation of extrusion and that after 1 hour of extrusion were determined, and the difference was taken as the resin pressure increase.

The titanium dioxide pigment of this invention shows a resin pressure increase of not more than 20 kg/cm$^2$ as determined by the above-mentioned method.

Next, this invention provides a process for producing a titanium dioxide pigment which comprises grinding titanium dioxide by using a fluid energy mill and adding a polyhydric alcohol and an aminosilane compound hydrolyzed beforehand to the titanium dioxide during the grinding. In this invention, the titanium dioxide is preferably coated with the hydrated oxide of aluminum before subjected to the coating treatment with a polyhydric alcohol and an aminosilane compound hydrolyzed beforehand.

In this invention, the coating of hydrated oxide of aluminum may be conducted by either of the method (1) wherein an aqueous solution of an aluminum compound is added to an aqueous slurry of titanium dioxide dispersed therein, and the resulting mixture is adjusted to a pH of 4–9 by use of an aqueous solution of an acidic compound or a basic compound or the method (2) wherein, while an aqueous slurry of titanium dioxide is being kept in the above-mentioned pH range by the addition of an acidic compound or basic compound, an aqueous solution of an aluminum compound is added into the slurry.

The solid concentration of titanium dioxide in the aqueous slurry is preferably 50–800 g/l, more preferably 100–500 g/l. When the concentration is higher than the above-mentioned range, the viscosity of the aqueous slurry tends to be too high, making it difficult to form a uniform coating on the titanium dioxide particle surface. When the concentration is lower than the range, the industrial operability of the coating tends to be poor.

The aluminum compound may be, for example, sodium aluminate, aluminum sulfate, aluminum nitrate and aluminum chloride. The pH control may be conducted by using an acidic compound, e.g., inorganic acids such as sulfuric acid and hydrochloric acid and organic acids such as acetic acid and formic acid, or an inorganic basic compound such as sodium hydroxide, potassium hydroxide and ammonia.

After having been coated with hydrated oxide of aluminum, the titanium dioxide is collected by filtration, then dried and, while it is being dry-ground with a fluid energy mill, a polyhydric alcohol and a hydrolysis product of an aminosilane compound which has been hydrolyzed beforehand are added into the mill, to form a coating layer comprising these organic compounds on the titanium dioxide. The aminosilane compound is mixed with water to form a mixture of a concentration of 5–95% by weight, preferably 30–70% by weight and the mixture is stirred thoroughly, thus to prepare the hydrolysis product of the aminosilane compound beforehand. Either of the polyhydric alcohol and the hydrolysis product of aminosilane compound may be added earlier than the other, or both of them may be added simultaneously; the method of addition is not particularly limited.

The fluid energy mills used are preferably those of swirling type, such as a jet mill, because of their good grinding efficiency and excellent mixing power. It is desirable to heat the mill to attain a temperature inside the mill of 120–300° C. or to heat a gas constituting the grinding medium, e.g., air or steam, to attain the temperature of the above-mentioned range because thereby the reaction of the hydrolysis product of aminosilane compound with hydroxyl groups on the titanium dioxide particle surface are further advanced, the aminosilane compound and unreacted water can be simultaneously evaporated and removed, and moreover the polyhydric alcohol is also vaporized and resultantly can coat the titanium dioxide more uniformly.

Even in dry treatments, a method of stirring and mixing with a high speed stirrer is undesirable because it cannot give uniform coating and produces pigments poor in dispersibility and hiding power; moreover, since the process steps are not continuous the method is also industrially disadvantageous. The use of an impact mill, such as a centrifugal roller mill, also hardly gives uniform coating.

EMBODIMENT

This invention is described in detail below with reference to Examples, which are merely for the sake of illustration and the scope of this invention is in no way limited thereby.

EXAMPLE 1

Coating of Hydrated Oxide of Aluminum

Anatase-type titanium oxide having an average particle diameter of 0.16 μm was mixed with water to prepare an aqueous slurry of 300 g/l in terms of the weight of titanium dioxide. While the slurry was being kept at 60° C., with stirring, sodium aluminate was added thereto in an amount of 0.30%, as $Al_2O_3$, relative to the weight of titanium dioxide. Then the slurry was neutralized to pH 5.0 with sulfuric acid to effect coating of the hydrated oxide of aluminum, then the coated titanium dioxide was collected by filtration, washed and dried at 120° C. for 10 hours.

Coating of Polyhydric Alcohol and Hydrolysis Product of Aminosilane Compound Aminopropyltriethoxysilane was diluted two-fold with pure water and stirred for 10 minutes to effect hydrolysis and thus to prepare an aqueous solution of a hydrolysis product. The titanium dioxide mentioned above was ground with a fluid energy mill using steam (grinding medium) heated to 250° C., during which 0.30% of trimethylolethane and an aqueous solution containing an amount of the hydrolysis product corresponding to 1.0% of aminopropyltriethoxysilane, respectively relative to the weight of titanium dioxide, were added into the mill to form coating of these substances on the titanium dioxide. Thus a titanium dioxide pigment was obtained.

EXAMPLE 2

A titanium dioxide pigment was obtained in the same manner as in Example 1 except that the hydrolysis product was coated in an amount corresponding to 2.0%, in terms of aminopropyltriethoxysilane, relative to the weight of titanium dioxide.

EXAMPLE 3

A titanium dioxide pigment was obtained in the same manner as in Example 1 except that trimethylolethane was coated in an amount of 0.50% relative to the weight of titanium dioxide.

EXAMPLE 4

A titanium dioxide pigment was obtained in the same manner as in Example 1 except that N-β(aminoethyl)γ-aminopropyltriethoxysilane was used in place of aminopropyltriethoxysilane.

EXAMPLE 5

A titanium dioxide pigment was obtained in the same manner as in Example 4 except that the hydrolysis product was coated in an amount corresponding to 2.0%, in terms of N-β(aminoethyl)γ-aminopropyltriethoxysilane, relative to the weight of titanium dioxide.

EXAMPLE 6

A titanium dioxide pigment was obtained in the same manner as in Example 1 except that the hydrolysis product was coated in an amount corresponding to 0.02%, in terms of aminopropyltriethoxysilane, relative to the weight of titanium dioxide.

Comparative Example 1

A titanium dioxide pigment was obtained in the same manner as in Example 1 except that no trimethylolethane was coated.

Comparative Example 2

A titanium dioxide pigment was obtained in the same manner as in Example 1 except that no aminopropyltriethoxysilane was coated.

Comparative Example 3

A titanium dioxide pigment was obtained in the same manner as in Example 1 except that aminopropyltriethoxysilane was coated without being hydrolyzed.

Comparative Example 4

The titanium dioxide coated with hydrated oxide of aluminum obtained as in Example 1 was ground with a fluid energy mill. Then, the resulting titanium dioxide was stirred together with an aqueous ethanol solution in an amount corresponding to 0.3% in terms of trimethylolethane and an aqueous solution containing a hydrolysis product in an amount corresponding to 1.0% in terms of aminopropyltriethoxysilane, respectively relative to the weight of titanium dioxide, with a high speed stirrer for 10 minutes so that the respective organic compounds were coated in the respective same amounts as in Example 1, and then dried at 120° C. for 10 hours to obtain a titanium dioxide pigment.

The pigment samples obtained in Examples 1–6 and Comparative Examples 1–4 were determined for their property and the results are shown in Table 1. These results were obtained by the following methods of determination.

(1) Dispersibility

Resin pressure increase was determined according to the aforementioned method and used as the criterion for dispersibility evaluation.

(2) Hiding Power

At the time of the above-mentioned dispersibility test, a T-die was attached to the discharge side of the Labo Plastomill, and the resin composition extruded from the Labo Plastomill was formed into a film 50 μm in thickness. The film was determined for its visible light transmittance by using a calorimeter (spectrophotometer UV-2200A, mfd. by Shimadzu Corp.) to judge the relative degree of hiding power. The criteria for the judgement are as follows.

Grade 6: Very excellent hiding power (low transmittance)
Grade 5: Excellent hiding power
Grade 4: Good hiding power
Grade 3: Rather poor hiding power
Grade 2: Poor hiding power
Grade 1: Very poor hiding power (high transmittance)

TABLE 1

|  | Dispersibility (Resin pressure increase) [Δp (kg/cm$^2$)] | Hiding power |
| --- | --- | --- |
| Example 1 | 10 | 5 |
| Example 2 | 10 | 6 |
| Example 3 | 5 | 5 |
| Example 4 | 10 | 5 |
| Example 5 | 10 | 6 |
| Example 6 | 10 | 4 |
| Comparative Example 1 | 100 | 3 |
| Comparative Example 2 | 20 | 1 |
| Comparative Example 3 | 20 | 1 |
| Comparative Example 4 | 100 | 3 |

Industrial Applicability

The titanium dioxide pigment of this invention has on its particle surface, preferably via a coating layer comprising the hydrated oxide of aluminum, a coating layer comprising a polyhydric alcohol and a hydrolysis product of an aminosilane compound and has a dispersibility of not more than 20 kg/cm² as judged in terms of resin pressure increase. Consequently, the pigment is excellent in hiding power and dispersibility and is quite advantageous as the coloring agent for thin film forming for plastics, particularly polyolefin resins.

What is claimed is:

1. A titanium dioxide pigment which comprises titanium dioxide particles having a coating layer comprising a polyhydric alcohol and a hydrolysis product of an aminosilane compound, wherein the dispersibility of the pigment is not more than 20 kg/cm² as judged in terms of resin pressure increase.

2. The titanium dioxide pigment according to claim 1 wherein the aminosilane compound is represented by the formula (1)

$$R_n\text{—}Si\text{—}(OR')_{4-n} \quad (1)$$

wherein R is an amino group-containing hydrocarbon group having 1–10 carbon atoms selected from the group consisting of aminoalkyl groups, diaminoalkyl groups and triaminoalkyl groups, R' is the methyl group or ethyl group, and n is an integer of 1–3; provided that when n is 2 or 3, R may be either the same kind of amino group-containing hydrocarbon groups or different kinds of amino group-containing hydrocarbon groups and that so long as at least one R is an amino group-containing hydrocarbon group, the remaining R(s) may be an alkyl group, vinyl group or methacryl group.

3. The titanium dioxide pigment according to claim 1 wherein the polyhydric alcohol is trimethylolethane, trimethylolpropane or pentaerythritol.

4. The titanium dioxide pigment according to claim 1 which further has a coating layer comprising the hydrated oxide of aluminum, the coating amount of the layer being 0.01–0.5% by weight in terms of $Al_2O_3$ relative to titanium dioxide.

5. The titanium dioxide pigment according to claim 1 wherein the coating amount of the hydrolysis product of the aminosilane compound is 0.01–3.0% by weight, in terms of the aminosilane compound, relative to titanium dioxide.

6. The titanium dioxide pigment according to claim 1 wherein the coating amount of the polyhydric alcohol is 0.05–1.0% by weight relative to titanium dioxide.

7. A process for producing the titanium dioxide pigment according to claim 1 which comprises grinding titanium dioxide by using a fluid energy mill and adding a polyhydric alcohol and an aminosilane compound hydrolyzed beforehand to the titanium dioxide during the grinding.

8. The process according to claim 7 wherein the inner temperature of the fluid energy mill is 120–300° C.

9. The process according to claim 7 wherein the temperature of the gas constituting the grinding medium of the fluid energy mill is 120–300°.

* * * * *